H. NELSON.
AUTOMOBILE FENDER.
APPLICATION FILED MAR. 5, 1914.
1,163,441.
Patented Dec. 7, 1915.
2 SHEETS—SHEET 1.
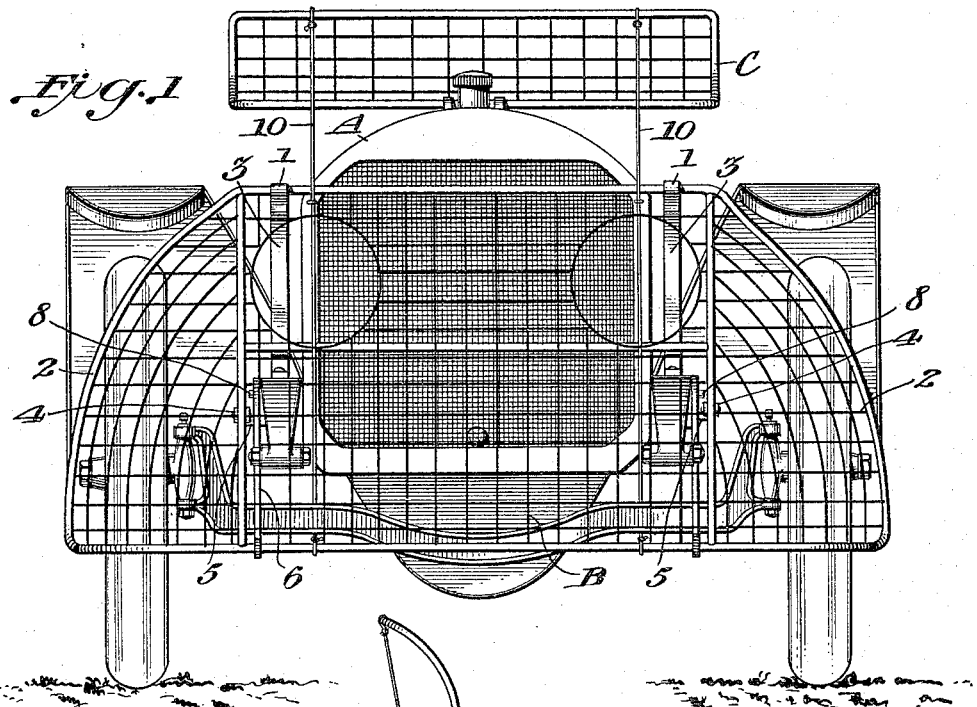
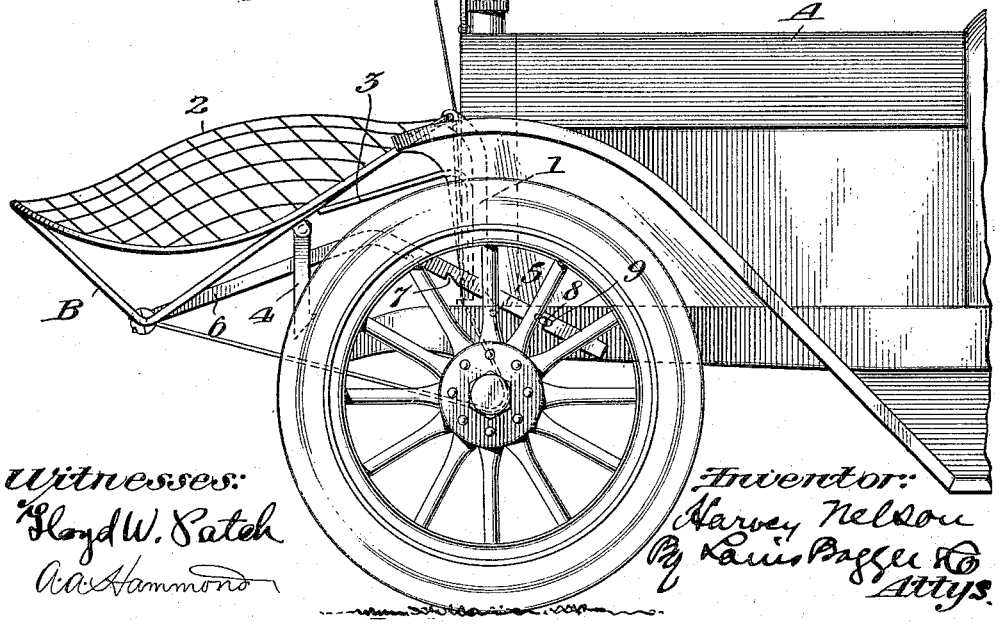

H. NELSON.
AUTOMOBILE FENDER.
APPLICATION FILED MAR. 5, 1914.
1,163,441.
Patented Dec. 7, 1915.
2 SHEETS—SHEET 2.
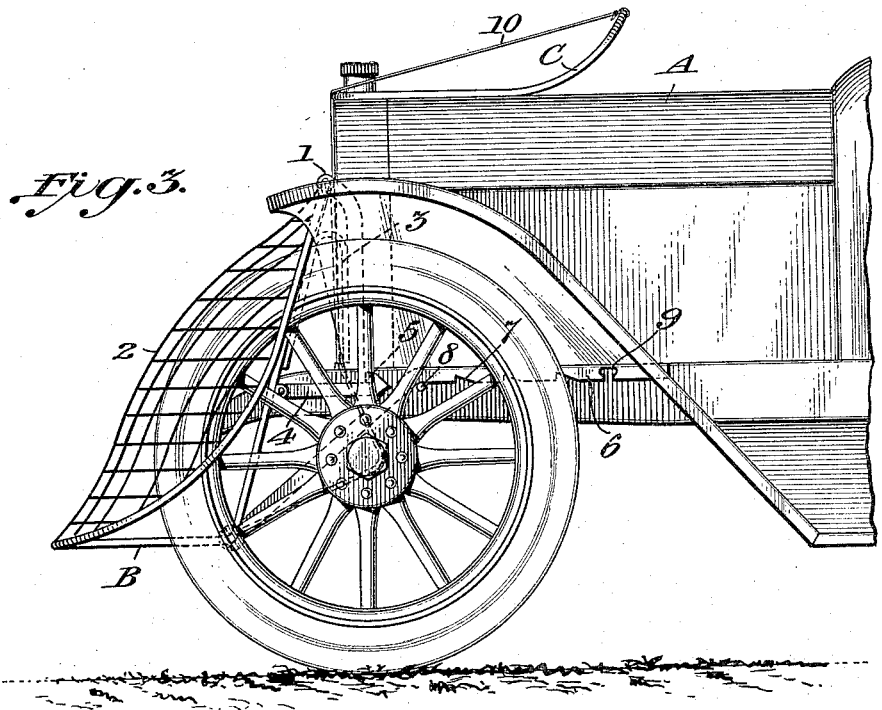
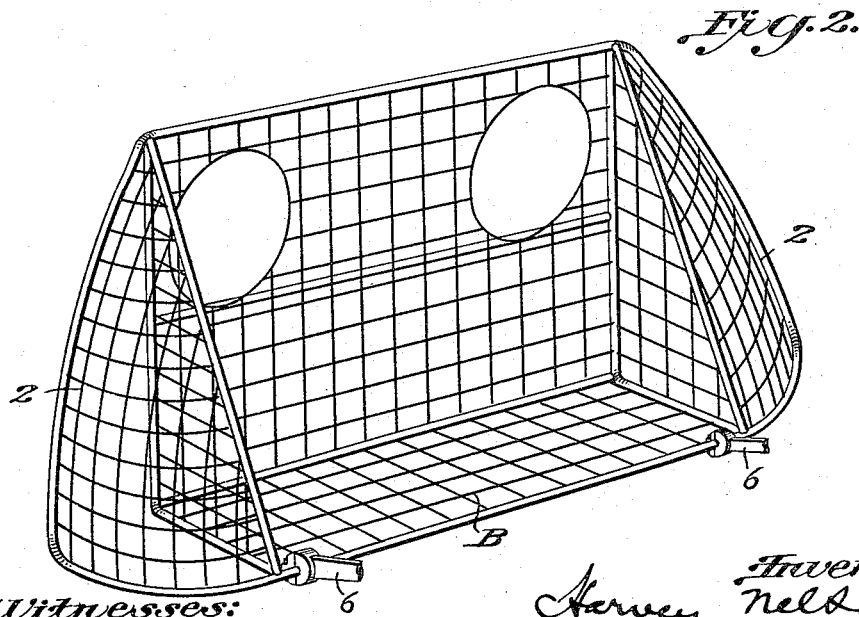

UNITED STATES PATENT OFFICE.

HARVEY NELSON, OF IRONWOOD, MICHIGAN.

AUTOMOBILE-FENDER.

1,163,441.     Specification of Letters Patent.     Patented Dec. 7, 1915.

Application filed March 5, 1914. Serial No. 822,633.

*To all whom it may concern:*

Be it known that I, HARVEY NELSON, citizen of the United States, residing at Ironwood, in the county of Gogebic and State of Michigan, have invented certain new and useful Improvements in Automobile-Fenders, of which the following is a specification.

My invention relates to an improvement in automobile fenders, and the object is to provide means for causing the fender to assume an elevated position when an object comes in contact with the fender.

When the fender moves from its normal position to an elevated position, it carries the object in the fender and raises it out of the path of the wheels and above the ground, instead of pushing the object in front of the vehicle or to one side until the machine can be brought under control.

The invention consists of still other novel features of construction and combinations of parts which will be hereinafter more fully described and pointed out in the claims.

In the accompanying drawings: Figure 1 is a view in front elevation showing the fender in its normal operative position; Fig. 2 is a perspective view of the fender; Fig. 3 is a view in side elevation; and Fig. 4 is a similar view showing the fender in an elevated or raised inoperative position.

A represents an automobile, and 1, 1 are standards mounted upon the frame of the vehicle. A scoop or basket B of any suitable construction, is suspended at its upper end by the uprights or standards 1, and connected to the side edges of the basket are wing fenders 2. Springs 3, 3 made V-shaped are connected to the standards or uprights 1, and to the rear side of the basket B. Latches 4 are pivotally connected to the basket B and are adapted to engage studs 5 on the frame of the vehicle for holding the basket in its normal or lowered position, so that any obstacle or object may be forced into the basket or moved out of the path of the wheels by the wing fenders 2. Back bars 6, 6 are rigidly connected to the lower edge of the basket, and extend along each side of the vehicle. The bars are provided with notches 7, 7 which are adapted to engage the pins 8 on the frames of the machine when the basket assumes an elevated position for holding the basket in its elevated position. Should the lower edge of the basket come in contact with an object, the springs 3 would be compressed, causing the latch to be released from the pins or studs 5, and as the springs are always under compression, the additional force which is exerted against the springs will compress them still further. These springs would eventually react, forcing the basket upward, and one of the notches 7 of each of the bars will engage the pins 8 it depending, of course, upon the load in the basket as to the elevation to which the springs 3 are capable of raising the basket. If the basket is raised to its limit of movement, the pins 8 will pass into the slots 9 in the ends of the bars 6, and lock the basket in this position.

A guard C is pivotally mounted upon the vehicle, and preferably upon the upper edge of the radiator of the car, by any standard hinge, which is provided with lugs to prevent any further forward movement than is required to permit the guard C to reach an upright position. Wires or flexible means 10, 10 are connected to the outer edges of the guard, and the wires are then connected to the basket B, so that when the basket is elevated, the guard will be raised from its normal position to a vertical position, for the purpose of preventing the object picked up in the basket from being thrown over the car. The guard C normally rests upon the hood of the machine.

I claim:

1. In a fender, the combination with a vehicle body, of a fender pivotally mounted thereon, means connected to the fender having engagement with the vehicle body for holding the fender in its operative position, said means being adapted to be disengaged for releasing the fender when the fender is brought in contact with an object, and means for elevating the fender when released.

2. In a fender, the combination of a vehicle body, of a fender pivotally mounted thereon, compressible means adapted to normally hold the fender in its raised or inoperative position, and means connected to the fender adapted to engage the vehicle body for maintaining the fender in its normal or operative position until an object is struck by the fender, which causes said means to be disengaged, thereby releasing the fender and causing it to move upward under the influence of the first-mentioned means.

3. In a fender, the combination of a vehicle body, of a fender pivotally mounted thereon, compressible means adapted to normally hold the fender in its raised or inoperative position, means connected to the fender adapted to engage the vehicle body for maintaining the fender in its normal or operative position until an object is struck by the fender, which causes said means to be disengaged, thereby releasing the fender and causing it to move upward under the influence of the first-mentioned means, and means connected to the fender having adjustable engagement with the vehicle body for assisting in maintaining the fender in its elevated position.

4. In a fender, the combination of a vehicle body, of a fender pivotally mounted thereon, a guard pivotally mounted upon the vehicle body and above the fender, means connecting the guard to the fender, means for holding the fender in its normal or operative position, said guard being adapted when the fender is moved to its normal or operative position to be moved to a horizontal position, said fender-holding means being adapted to be actuated for releasing the fender when an object is struck by the fender, and means for causing the fender to be moved to an elevated position upon the release of the fender from its holding means, and the upward movement of the fender causing the guard to be drawn to a vertical position.

In testimony whereof I affix my signature, in the presence of two witnesses.

HARVEY NELSON.

Witnesses:
CHARLES M. HUMPHREY,
ELSIE SCHMEISER.

Copies of this patent may be obtained for five cents each, by addressing the "Commissioner of Patents, Washington, D. C."